United States Patent [19]
Falconer et al.

[11] Patent Number: 5,821,657
[45] Date of Patent: Oct. 13, 1998

[54] ELECTROMAGNETIC VIBRATORY FEEDER WITH RARE EARTH MAGNET

[75] Inventors: Thomas H. Falconer, Erie; Marshall A. Carner, Fairview; Jerry A. Selvaggi, Erie, all of Pa.

[73] Assignee: Eriez Manufacturing Company, Erie, Pa.

[21] Appl. No.: 753,746

[22] Filed: Nov. 29, 1996

[51] Int. Cl.⁶ .................................................. H02K 5/00
[52] U.S. Cl. .............................. 310/91; 310/85; 310/86; 310/89; 198/609; 198/769
[58] Field of Search ................... 310/91, 86, 85, 310/89; 198/769, 609

[56] References Cited

U.S. PATENT DOCUMENTS

| | | | |
|---|---|---|---|
| 2,895,064 | 7/1959 | Hoff et al. | 310/29 |
| 3,817,370 | 6/1974 | Cox | 198/220 |
| 4,378,064 | 3/1983 | Brown | 198/769 |
| 4,900,965 | 2/1990 | Fisher | 310/216 |
| 4,954,034 | 9/1990 | Nelson et al. | 414/156 |
| 4,961,491 | 10/1990 | Falconer | 198/761 |
| 4,979,608 | 12/1990 | Mikata et al. | 198/566 |
| 5,086,442 | 2/1992 | Gemmel et al. | 378/132 |
| 5,196,749 | 3/1993 | Palma et al. | 310/217 |
| 5,239,219 | 8/1993 | Matsumoto et al. | 310/81 |
| 5,313,061 | 5/1994 | Drew et al. | 250/281 |
| 5,525,842 | 6/1996 | Leininger | 290/54 |

*Primary Examiner*—Steven L. Stephan
*Assistant Examiner*—Elvin G. Enad
*Attorney, Agent, or Firm*—Lovercheck and Lovercheck

[57] ABSTRACT

A vibratory feeder for feeding low density powered material having a tray, a base and a motor supporting the tray on the base. The motor includes an electromagnet having an AC coil supported on an intermediate leg between the outer legs and an armature having a permanent magnet and two pole plates. The pole plates being disposed in the spaces between the outer legs and the intermediate leg. A rare earth magnet is supported between the pole plates. Spaces between the electromagnet legs and the pole plates providing for a stroke of about 0.2 inch at a frequency of 30 Hertz and a tuning spring connecting the motor to the tray. The tuning spring being adjustable to change the deflection of the tray relative to the motor.

12 Claims, 2 Drawing Sheets

ELECTROMAGNETIC VIBRATORY FEEDER WITH RARE EARTH MAGNET

BACKGROUND OF THE INVENTION

Applicant's standard and hi-speed electromagnetic vibratory feeders are two mass systems tuned to operate at a frequency of 60 Hertz and tray deflections of 60 and 90 thousands of an inch respectively. Both types of feeders utilize the unique applicant's vibratory motor described in U.S. Pat. No. 2,895,064 using ceramic or alnico permanent magnets. These machines are use to transport bulk materials such as coal, sand, tobacco, flour, etc.

Some materials, especially powders such as flour, tend to aerate when subjected to vibratory motion at the above conditions. The flowability of such materials can be improved by reducing the operating frequency and increasing the deflection of the tray. This has been verified experimentally with applicant's vibratory feeder using applicant's modified vibratory motor.

SUMMARY OF THE INVENTION

As an example of the vibratory feeder for feeding flour, the motor air gap of a vibratory feeder was increased from its normal 0.093 thousands of an inch to 0.25 inch to accommodate a tray deflection of 0.188 inch with the feeder operating at 30 Hertz. Though flour flowed satisfactory in the tray, however, the feeder motor over heated significantly.

The excessive heating was attributed to the increased air gap which reduced the circuit reactance and this resulted in a higher operating current.

To resolve the temperature problem, a rare earth permanent magnet was substituted for the standard ceramic permanent magnet in the motor armature. Also, additional turns were wound on the electromagnet portion of the motor. This combination resulted in a lower current while still maintaining the required motor force. Moreover, the operating temperature of the motor was reduced substantially.

The amount of force generated by applicant's vibratory motor is proportional to magnetic flux density produced by the electromagnet times the magnetic flux density produced by the permanent magnet times the intermesh area.

Heating of the motor was a result of the increased alternating current and the alternating flux density of the electromagnet causing eddy currents.

Increasing the tray stroke to 0.20 inch requires a major modification to the vibratory motor. First, the air gap between the poles of the electromagnet and permanent magnet must be increased to allow for the higher deflection. The increase in air gap results in two major consequences.

1. The electrical inductance of motor is decreased causing a rise in the alternating current of the electromagnet. This action will increase the motor heating. To compensate additional turns of wire must be added to the coil which increases the electrical inductance and lowers the current. Lowering the current, however, lowers the magnetic flux produced by the electromagnet and this in turn, lowers the force of the motor which must be maintained.
2. An increase in the air gap reduces the amount of magnetic flux produced by the permanent magnet. This action results in a loss of motor force.

The two factors above result in an undesirable loss of motor force. The loss of motor force can be overcome by replacing the ceramic permanent magnet with a more powerful rare earth (neodymium boron iron) magnet. This modification allows the motor force to be maintained without increasing the operating temperature and to do so in the same working volume of the motor.

Applicant is aware of the following U.S. Pat. Nos. 2,895,064 and 4,961,491.

It is an object of the present invention to provide an improved vibratory feeder.

Another object of the present invention to provide a electromagnetic vibratory feeder that is simple in construction, economical to manufacture and simple and efficient to use.

Another object of the present invention is to provide an improved vibratory feeder using a rare earth magnet for feeding low density powered material.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
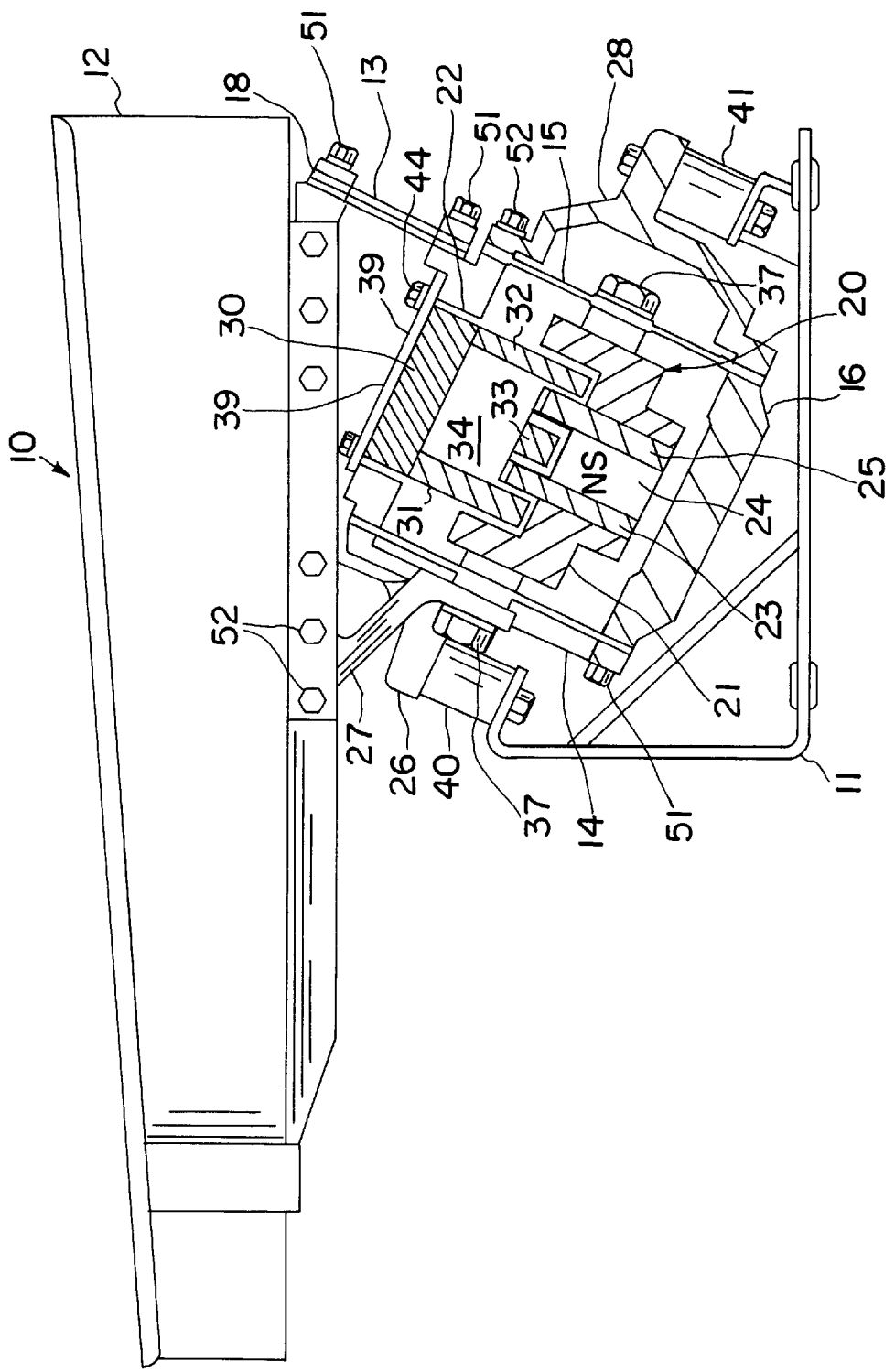
FIG. 1 is a side view of a feeder according to the invention with the motor shown in cross section.
Figure 2:
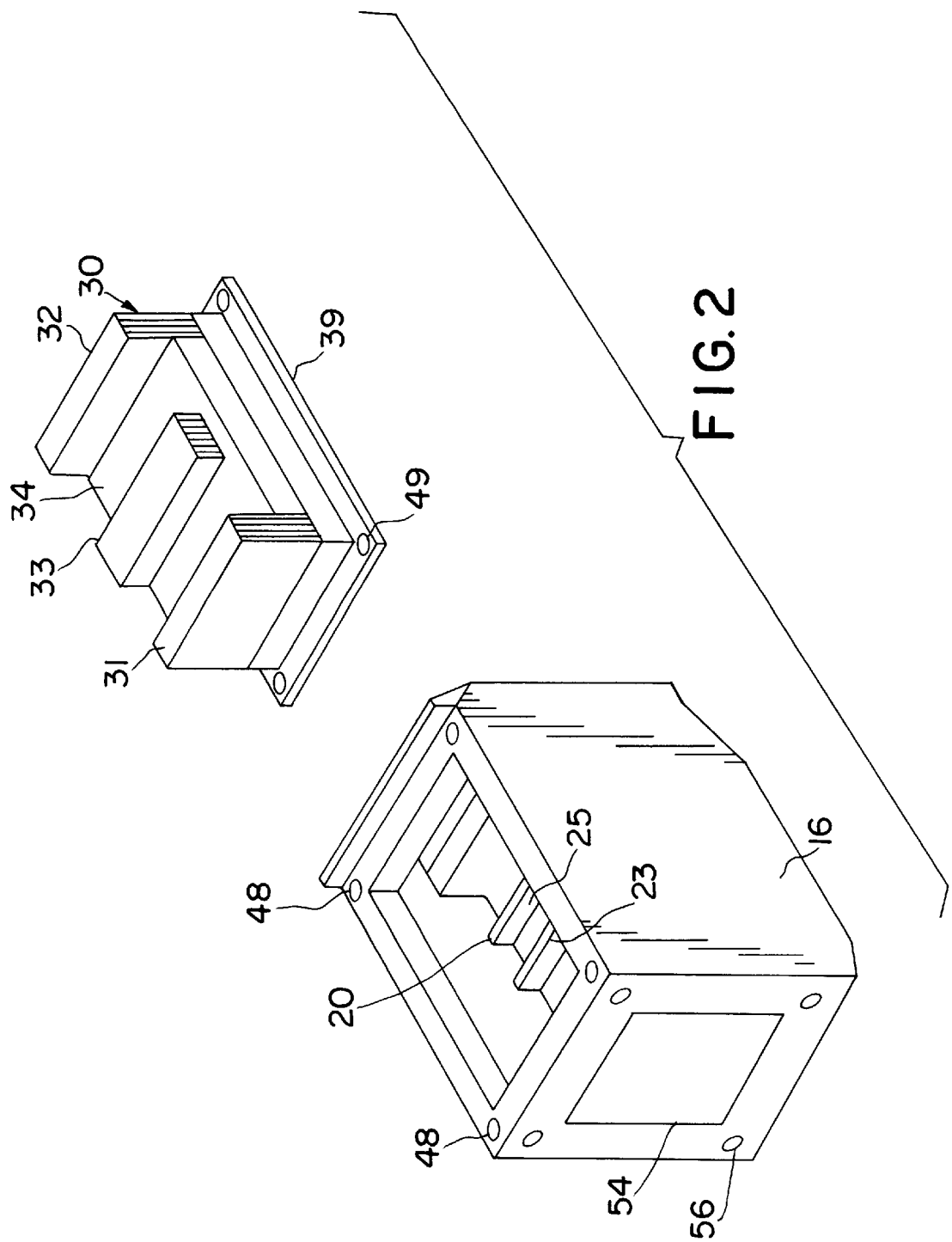
FIG. 2 is an isometric view of the vibratory feeder motor body and top plate removed.

Now with more particular reference to the drawings, electromagnetic vibratory feeder 10 is shown having base 11, tray 12 and hollow motor body 16.

Hollow motor body 16 has first opening 54 with first spring 14 extending across first opening 54 and having ends of spring 14 clamped between first bracket 26 and hollow motor body 16 by studs 51. Second spring 15 extends across second opening 55 and has its ends sandwhiched between hollow motor body 16 and second bracket 28 and clamped by studs 52 in threaded holes 56. First bracket 26 is supported on base 11 by resilient mount 40 and second bracket 28 is supported on base 11 by second resilient mount 41. Hollow motor body 16 also has third opening 22 in its top covered by plate 39.

Armature 20 is supported on non-magnetic casting 21. Non-magnetic casting 21 has its first end supported on an intermediate part of first spring 14 and clamped to bracket 27 by studs 37. The second end of casting 21 is attached to an intermediate part of second spring 15 by stud 37. Rare earth magnet 24 is supported on armature 20 between pole plates 23,25. Pole plates 23,25 are made of magnetic material.

Plate 39 is supported on motor frame 16 by studs 44 and covers the third opening in the top of motor frame 16. Laminated E-frame assembly 30 is fixed to plate 39. Plate 39 has enlarged holes 49 in its outer periphery that receive bolts 44 which threadably engage holes 48 in motor frame 16. Coil 34 is wound around leg 33.

Laminated E-frame assembly 30 has outer legs 31,32 and intermediate leg 33 with spaces between them. Pole plates 23,25 on armature 20 are received in spaces between intermediate leg 33 and outer legs 31,32. Enlarged holes 49 in plate 39 allow plate 39 with laminated E-frame assembly 30 attached to it to be adjusted laterally and longitudinally to adjust the air gap between pole plates 23,25 and legs 31,32,33 of laminated E-frame assembly 30.

Tray 12 is supported on bracket 27 and on tuning spring 13. Bracket 27 is clamped to an intermediate part of leaf spring 14 by stud 37. Bracket 27 is fixed to tray 12 by studs 52.

The tray stroke is controlled by changing the stiffness of tuning spring 13. Tuning spring 13 is attached to motor frame 16 and tray 12 by studs 51 and made up of a stack of several flat plate like spring leaves 18. The stiffness of tuning spring 13 can be increased by adding spring leaves 18 to tuning spring 13 and decreased by removing spring leaves 18 from tuning spring 13.

Applicant has discovered that an air gap of about 0.25 inches to accommodate a tray deflection of approximately 0.2 inches with 30 Hertz AC power applied to coil 34 is satisfactory for low density powder material, but tray deflection and air gap can be varied to achieve an individuals purpose.

The foregoing specification sets forth the invention in its preferred, practical forms but the structure shown is capable of modification within a range of equivalents without departing from the invention which is to be understood is broadly novel as is commensurate with the appended claims.

We claim:

1. A vibratory feeder for feeding low density powdered material comprising a tray, a vibrating motor and a base;

spring means connecting said vibrating motor to said tray;

said motor comprising an armature and an alternating current electromagnet to be operated at 30 Hertz;

said armature comprising two spaced pole plates and a rare earth permanent magnet disposed between said pole plates;

said electromagnet comprising two outer legs and an intermediate leg between said outer legs defining an E-shape with spaces between said outer legs and said intermediate leg;

a solenoid on said intermediate leg;

said pole plates of said armature being disposed in said spaces between said legs of said electromagnet with an air gap between said pole plates and said legs;

adjusting means supporting said legs whereby the air gap between said legs and said pole plates can be adjusted to adjust the stroke of said feeder.

2. The vibratory feeder recited in claim 1 wherein said rare earth magnet is made of NdFeB.

3. The vibratory feeder recited in claim 1 wherein said adjusting means supporting said electromagnet comprises a frame having an opening;

said adjusting means comprises a support plate slidably supported on said frame over said opening;

said electromagnet being attached to said plate whereby said legs are movable relative to said pole plates whereby the spaces between said pole plates and said legs are adjustable.

4. The vibratory feeder recited in claim 3 wherein said adjusting means comprises large holes in said support plate and bolts of smaller diameter than the diameter of said holes extending through said large holes in said support plate;

said bolts being attached to said motor frame;

said bolts being of smaller diameter than the diameter of said holes;

whereby said plates can be moved on said bolts to adjust said legs relative to said pole plates to change the spacing of said legs from said pole plates.

5. The vibratory feeder recited in claim 4 wherein the air gap of said feeder is adjustable to at least 0.25 inches to accommodate a deflection of said tray of at least 0.2 inches with said solenoid being operated on an AC alternating voltage of about 30 hertz.

6. The feeder recited in claim 1 wherein said adjusting means comprises a leaf spring having a first end attached to said tray and a second end attached to said motor for controlling the amplitude of said deflection of said tray.

7. The feeder recited in claim 6 wherein said spring is made of a plurality of plate like leaves and said adjusting means comprises changing the number of said leaves to increase or decrease the stiffness of said spring.

8. The vibratory feeder recited in claim 1 wherein said feeder has an air gap space between said pole plates and said legs of at least 0.25 inches.

9. A vibratory feeder comprising a tray, a vibrating motor and a base;

spring means connecting said vibrating motor to said tray;

said motor comprising an armature and an electromagnet;

said armature comprising two spaced pole plates and a rare earth permanent magnet disposed between said pole plates;

said electromagnet comprising three spaced legs;

a solenoid on one of said legs;

said pole plates of said armature being disposed between said legs of said electromagnet with an air gap between said pole plates and said legs;

adjusting means supporting said legs whereby said air gap between said legs and said pole plates can be adjusted to adjust the stroke of said feeder.

10. The vibratory feeder recited in claim 9 wherein said rare earth magnet is made of NdFeB.

11. The vibratory feeder recited in claim 9 wherein said adjusting means supporting said electromagnet comprises a frame having an opening;

said adjusting means comprises a support plate slidably supported on said frame over said opening;

said electromagnet being attached to said plate whereby said legs are moved relative to said pole plates whereby the spaces between said pole plates and said legs are adjusted.

12. The vibratory feeder recited in claim 10 wherein said adjusting means comprises large diameter holes in said support plate and bolts having a diameter smaller than the diameter of said holes and extending through said large holes in said support plate;

whereby said plates can be attached to said motor and moved on said bolts to adjust said legs relative to said pole plates to change the spacing of said legs from said pole plates.

* * * * *